(12) United States Patent
Gampp et al.

(10) Patent No.: US 6,438,280 B1
(45) Date of Patent: Aug. 20, 2002

(54) INTEGRATED OPTICS CHIP HAVING REDUCED SURFACE WAVE PROPAGATION

(75) Inventors: Lorrie L. Gampp, Reseda, CA (US); Gregory Zimmerman, Layton, UT (US); Arthur R. Martinez, Canoga Park; Thomas M. Flaherty, Agoura Hills, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/469,427

(22) Filed: Dec. 23, 1999

(51) Int. Cl.[7] .................................................. G02B 6/12
(52) U.S. Cl. .............................. 385/14; 385/42; 385/44; 385/45
(58) Field of Search .............................. 385/14, 45, 42, 385/44

(56) References Cited

U.S. PATENT DOCUMENTS

| 4,976,506 | A |   | 12/1990 | Pavlath |        |
|-----------|---|---|---------|---------|--------|
| 5,046,808 | A |   | 9/1991  | Chang   |        |
| 5,193,136 | A |   | 3/1993  | Chang   |        |
| 5,321,779 | A | * | 6/1994  | Kissa   | 385/14 |
| 5,393,371 | A |   | 2/1995  | Chang   |        |
| 5,442,719 | A |   | 8/1995  | Chang   |        |
| 6,212,307 | B1| * | 4/2001  | Labeye  | 385/14 |

* cited by examiner

*Primary Examiner*—Cassandra Spyrou
*Assistant Examiner*—Leo Boutsikaris
(74) *Attorney, Agent, or Firm*—Lynn & Lynn (57) ABSTRACT

An optical waveguide is formed in an integrated optics chip that includes a substrate formed of an electrooptically active material. The optical waveguide network has an input facet where optical signals may be input to the optical waveguide network and an output facet where optical signals may be output from the optical waveguide network. A structure is located in an upper layer of the substrate to prevent surface waves that propagate in the substrate from cross coupling into the output facet.

32 Claims, 4 Drawing Sheets

INTEGRATED OPTICS CHIP HAVING REDUCED SURFACE WAVE PROPAGATION

BACKGROUND OF THE INVENTION

This invention relates generally to the field of integrated optics chips or devices and more particularly to the field of multifunction integrated optics chips such as those having integrated optic components formed in lithium niobate (LiNbO$_3$) substrates. Integrated optics components formed on such chips include waveguides that may be arranged to function as optical couplers, polarizers and phase modulators. Multiple functions may be incorporated on a single device, which eliminates losses and errors associated with interfacing separate devices. This invention is particularly directed to methods and apparatus for improving polarization extinction ratio or for reducing polarization non-reciprocity (PNR) errors in a multifunctional integrated optics chip as a result of surface wave propagations, which can cross couple into optical fibers through the fiber optic pigtails that are connected to the optical waveguides.

Multifunctional Integrated Optical Chips (MIOC's) are usually fabricated in large numbers on three to four inch wafers of lithium niobate (LiNbO3) using conventional photomasks, vacuum deposition, chemical baths, proton exchange, diffusion and etching techniques to form large numbers of identical components at low cost and with high reliability. MIOC's capable of performing many of the aforementioned functions are used in fabricating middle and high accuracy fiber optic gyroscopes (FOG's) or rotation sensors. The FOG uses the Sagnac effect to measure rates of rotation about an axis perpendicular to a coil of optical fiber. MIOC's may also be used in forming other fiber optic sensors such as hydrophones or geophones that rely on the principles of the Mach-Zehnder or Michelson interferometer.

A fiber optic gyroscope includes means for introducing counterpropagating waves from an optical signal source into an optical fiber coil. Rotation of the coil about an axis perpendicular to the plane of the coil produces a phase difference between the clockwise and counterclockwise waves via the Sagnac effect. The phase shift occurs because waves that traverse the coil in the direction of the rotation have a longer transit time through the optical fiber coil than waves that traverse the coil in the opposite direction. The waves are combined after propagating through the coil. This combination of waves produces an interference pattern that may be processed to determine the rate of rotation. Techniques for determining the rotation rate are well-known in the art.

It is common practice to form a FOG to include a multifunctional integrated optics chip (MIOC) between the optical signal source and the optical fiber coil, which is typically formed of polarization maintaining fiber. The MIOC typically includes a plurality of optical waveguides arranged to form a Y-junction. The base of the Y-junction is connected to the optical signal source while the arms of the Y-junction are interfaced with ends of the optical fiber coil. Optical signals input to the multifunctional integrated optics chip divide at the Y-junction to form optical signals that are input to the ends of the optical fiber coil as the counter-propagating waves. After propagating through the coil, the waves enter the optical waveguides that form the arms of the Y-junction. The waves then combine in the Y-junction and are output from the base of the Y-junction to an optical fiber. The combined waves are guided to a photodetector that produces an electrical signal that is processed to determine the rotation rate.

The desired condition in a fiber optic rotation sensor is the transverse electric (TE) mode propagating in the optical fiber coil and in the optical waveguides without added path lengths. Propagation of TE modes having added path lengths and transverse magnetic (TM) modes are undesired conditions. Error sources such as polarization cross coupling, which adds a phase shift (or polarization non-reciprocity, PNR, which is associated with always having two polarization components possible in the fiber at all times), manifest themselves as additional optical path differences in direct competition with the Sagnac effect. These error sources cause phase bias and amplitude bias errors when they are modulated at the frequency used by the phase modulators in the MIOC. The bias component in the fiber optic rotation sensor due to polarization cross coupling is inversely proportional to the square root of the absolute value of the polarization extinction ratio. Extinction ratio is defined as ten times the logarithm of the ratio of the undesired power (the power of the undesired mode) to the desired power (the power of the desired mode) of the polarization modes expressed in decibels. Minimizing cross coupling (maximizing the absolute value of the extinction ratio) in the MIOC reduces this type of bias error.

As further background, integrated optics chips (IOCs), such as those disclosed herein may be formed using processes and steps similar to some of those disclosed in U.S. Pat. No. 5,193,136, which issued to Chin L. Chang et al. on Mar. 9, 1993 for PROCESS FOR MAKING MULTIFUNCTION INTEGRATED OPTICS CHIPS HAVING HIGH ELECTRO-OPTIC COEFFICIENTS; U.S. Pat. No. 5,046,808, which issued to Chin L. Chang on Sep. 10, 1991 for INTEGRATED OPTICS CHIP AND METHOD OF CONNECTING OPTICAL FIBER THERETO; U.S. Pat. No. 5,393,371, which issued to Chin L. Chang et al. on Feb. 28, 1995 for INTEGRATED OPTICS CHIPS AND LASER ABLATION METHODS FOR ATTACHMENT OF OPTICAL FIBERS THERETO FOR LiNbO$_3$ SUBSTRATES; U.S. Pat. No. 5,442,719, which issued to Chin L. Chang et al. on Aug. 15, 1995 for ELECTRO-OPTIC WAVEGUIDES AND PHASE MODULATORS AND METHODS FOR MAKING THEM; and U.S. Pat. No. 4,976,506, which issued to George A. Pavlath on Dec. 11, 1990 for METHODS FOR RUGGED ATTACHMENT OF FIBERS TO INTEGRATED OPTICS CHIPS AND PRODUCT THEREOF.

Each of the foregoing patents is assigned to Litton Systems, Inc. of Woodland Hills, Calif. Each of the foregoing patents cited above is incorporated herein by reference for the purpose of providing those skilled in the art with background information on how integrated optics chips or multifunctional integrated optics chips are made.

Conventional MIOC's do not use any known method of reducing or eliminating surface propagating light rays, which can cross couple into the opposite pigtail(s). These weakly guided rays may be propagated by a thin (less than 1 micron) slab waveguide on the top surface of the MIOC. It has been found that during high temperature processes often used in fabricating the IOC, lithium ions out-diffuse from the crystal surface, forming a high-index layer which acts as a surface slab waveguide. Leakage may occur from the channel waveguide into this slab. Weakly guided surface modes also have the potential of traveling along the surface towards the sides, reflecting off the top edge and back to be coupled into a pigtail. However, this is not as likely because the top edge of the chip is more likely to reflect this light down into the chip unless it has a perfectly square top edge.

If the gyro bias is significantly reduced, there is the potential to reduce the fiber costs by replacing polarization maintaining fiber with less expensive single mode fiber, or by using a shorter length of polarization maintaining fiber than is presently used. There is also the potential to support increased gyro accuracy.

SUMMARY OF THE INVENTION

The present invention is designed to extinguish, divert, or trap the various light paths that could potentially cross couple through reflections off the top and sides of an integrated optics chip. The present invention incorporates a passive method for manipulation of a surface propagating wave by diverting it to a position where it is not likely to cross couple, by absorbing or trapping it or by diffusing the light to minimize the effect of cross coupling.

An integrated optics chip, according to the present invention comprises a substrate formed of an electrooptically active material with an optical waveguide network being formed on a first surface of the substrate. The optical waveguide network has an input facet where optical signals may be input to the optical waveguide network and an output facet where optical signals may be output from the optical waveguide network. The integrated optics chip according to the present invention further includes a structure located in an upper layer of the substrate arranged to prevent surface waves that propagate in the substrate from coupling into the output facet.

The structure that prevents surface waves that propagate in the substrate from coupling into the output facet may comprise a first layer that includes a first metal and a second layer that comprises a second metal. The first layer preferably comprises titanium, and the second layer preferably comprises gold.

The structure that prevents surface waves that propagate in the substrate from coupling into the output facet may comprise a region of the substrate that has been processed to have a second refractive index that differs from the refractive index of the remainder of the substrate.

The structure having the second refractive index may be formed as a focusing region having a focal length that directs surface waves away from the facets of the optical waveguide network, or diffuses the surface propagating rays to minimize cross coupling.

An appreciation of the objectives of the present invention and a more complete understanding of its structure and method of operation may be had by studying the following description of the preferred embodiment and by referring to the accompanying drawings.

DETAILED DESCRIPTION OF THE INVENTION

None of the drawings included with this disclosure are to scale. Some of the dimensions of components included in, the drawings are so small that they must be shown in an enlarged scale relative to other components.

Figure 1A:
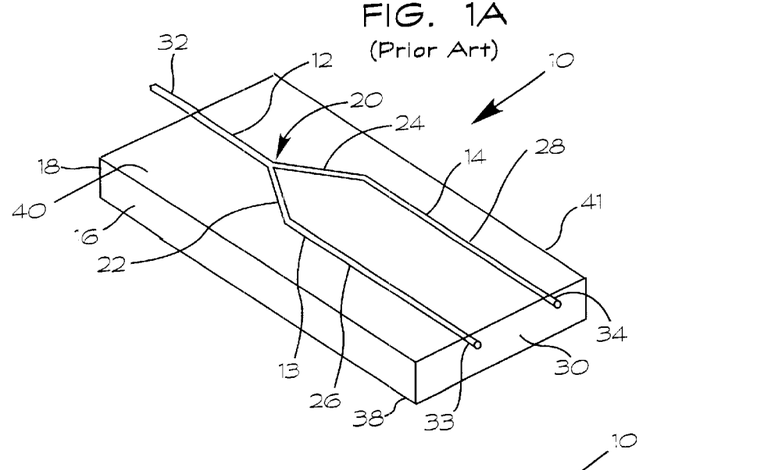
FIG. 1A is a perspective view of a prior art MIOC.

FIG. 1A illustrates a conventional prior art MIOC 10 that includes three optical waveguides 12–14 arranged to form an optical waveguide network 15 on a substrate 16. The substrate 16 is formed of an electrooptically active material such as lithium niobate, $LiNbO_3$, which is ordinarily used in forming such devices. The optical waveguides 12–14 are formed by doping portions of the substrate 16 using processes that are well-known in the art.

The optical waveguide 12 extends from an edge 18 of the substrate 16 to a Y-junction 20 where the optical waveguides 12–14 intersect. The optical waveguides 13 and 14 have angled portions 22 and 24, respectively, that extend between the Y-junction 20 and parallel portions 26 and 28. The optical waveguides 13 and 14 extend between the Y-junction 20 and an edge 30 of the substrate 16 that is generally parallel to the edge 18 thereof.

The optical waveguides 12–14 are formed such that optical fibers 32–34, respectively, may be butt-coupled to them to interface the MIOC 10 with other components (not shown). To facilitate describing both the prior art and the invention, the optical fiber 32 is subsequently referred to as the input fiber pigtail 32, and the optical fibers 33 and 34 are referred to as the output fiber pigtails 33 and 34.

Figure 1B:
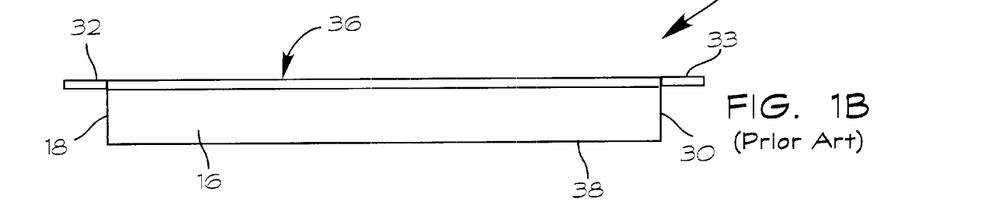
FIG. 1B is a side elevation view of the prior art MIOC of FIG. 1A.
Figure 1C:
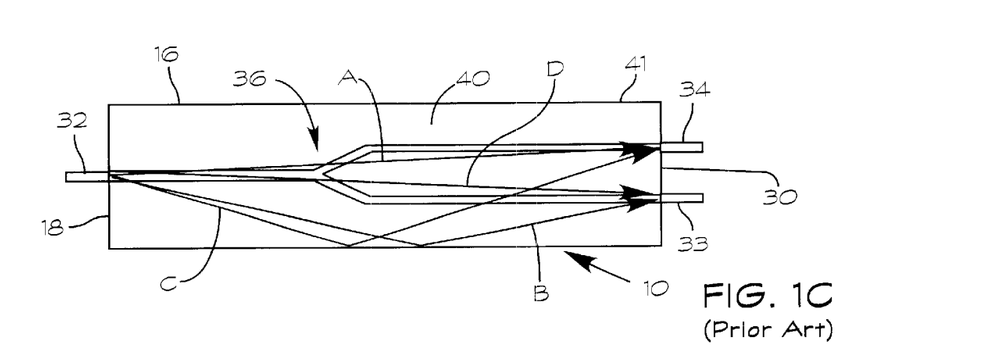
FIG. 1C is a top plan view of the MIOC of FIG. 1A MIOC showing surface light paths that couple between the input and output fiber optic pigtails.

As previously explained, processes used in the fabrication of a MIOC can produce a thin slab optical waveguide 36, best shown in FIG. 1B, in the upper portion of the substrate. When the MIOC 10 is used in forming a device such as a fiber optic gyroscope, an optical signal is input to the optical waveguide 12 from the input fiber optic pigtail 32. Some of the signal from the input pigtail 32 may become scattered at the interface between the pigtail 32 and the optical waveguide 12. In particular, some of this scattered light may be coupled into the slab optical waveguide 36. Light propagates in the slab optical waveguide 36 toward the side surfaces 38 and 40 of the MIOC 10, where reflections occur. The arrows B and C illustrate possible paths that surface waves can follow in the surface waveguide 36. As shown in FIG. 1C, some of the reflected surface waves can become coupled into the output pigtails 33 and 34. In addition, part of the surface wave propagates directly, without reflection, toward the pigtails 33 and 34 and is also coupled into the output of the MIOC 10 as is shown with the arrow A.

Figure 1D:
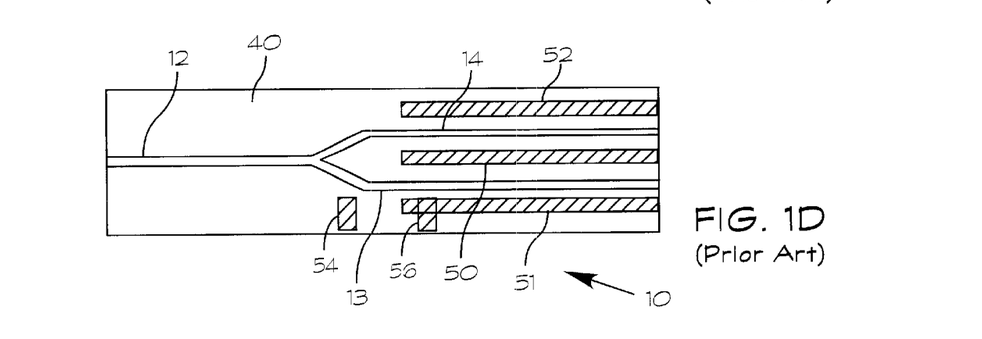
FIG. 1D is a top plan view of the MIOC of FIGS. 1A and 1B showing a typical electrode pattern formed on its upper surface.

FIG. 1D shows three electrodes 50–52 formed on the upper surface 44 of the MIOC 10. The electrodes 50–52 are arranged so that the electrode 50 is between the parallel portions of the optical waveguides 13 and 14. The optical waveguide 13 is between the electrodes 50 and 51, and the optical waveguide 14 is between the electrodes 50 and 52. Electrical contacts 54 and 56 may also be formed on the upper surface 44. The electrodes 50–52 arm normally used to form a push-pull phase modulator when the MIOC 10 is incorporated into a FOT (not shown).

It has been found that in order to prevent the cross coupling which occurs due to weakly guided surface modes, one must construct an optical block, trap or diversion that prevents the surface modes from being propagated across the full length of the MIOC where they can cross couple into a fiber optic pigtail. For purposes of explaining the invention, it is assumed that an optical signal is input to the optical fiber pigtail 32, divided at the Y-junction and then output at the optical fiber pigtails 33 and 34.

One method according to the present invention for spoiling a weakly guided surface mode is to change the boundary conditions at the IOC surface where the thin slab waveguide has been formed by utilizing (for example) a metal or other absorbing or reflecting material. A second method according to the present invention for spoiling a weakly guided surface mode is to construct an index of refraction change designed to act like a very short focal length lens. A third method according to the present invention is to produce a refractive index change in the slab waveguide by adding a geometrical shape of material to the surface of the MIOC. This interruption of the wave can effectively stop or inhibit the errors due to polarization cross coupling in an integrated optics chip.

Implementing these concepts for blocking, diverting, or absorbing surface guided modes (or rays) requires that the features selected according to this invention be incorporated into the photolithography masks for fabrication of the MIOC 10. The geometric designs can be incorporated such that they touch or cross the waveguide network 15. The geometric designs may alternatively be in close proximity to the waveguide network 15. They may also be located at a distance from the waveguide network 15 but directly in the path of a targeted surface propagating wave. When designing the shape and the location one must take into consideration all of the processing steps the material will undergo in order to achieve the desired results.

FIGS. 2–15 show examples which can be used for either the addition of an absorbing or reflecting material (i.e. gold), or of an index change in the surface of the chip in a geometrical shape or pattern which will either change the direction of the surface waves or absorb the surface light. Alternatively both index change and addition of material can be used together. The easiest method of creating the surface index change is to create a pattern or shape through the same means as the creation of the optical waveguides 12–14. In this particular case a proton exchange method is the preferred process, which adds no cost to the fabrication of the MIOC 10. Titanium diffused waveguide fabrication lines could also use a titanium diffused surface index change in a geometrical pattern for blocking, inhibiting or altering the direction of surface propagating light, again at no additional cost.

A pattern for a metal barrier or absorber can be integrated into the photolithography (mask) for the modulator electrodes, which also adds no cost in the fabrication of the MIOC 10. More than one repetition of the pattern or shape may be used to increase the effects. A few possible designs are discussed below. The design could use either the index change method, the topical application method, or a combination thereof, with like or different geometric patterns. The size, shape and extension of the blocks, lenses, diverters, or absorbers in the lateral and longitudinal directions will be dependent upon the total chip length and waveguide design of the optical chip as well as the location of the fiber optic pigtails. When the absorbers or diverters are used in a parallel path situation, such as a Mach-Zehnder or after a Y-junction, an offset or a stagger may be required as shown in FIGS. 6, 10, 13, 15. The offset should be greater than the coherence length of the source.

FIGS. 2–15 illustrate apparatus and methods for reducing surface wave propagation in integrated optics chips. These figures are all top plan views with the optical waveguides shown as simple lines. It is to be understood that except for the addition of structure or material to reduce surface wave propagation, the integrated optics chips may be similar to the prior art integrated optics chips described with reference to FIGS. 1A–1D. Therefore all of the integrated optics chips of FIGS. 2–16 include the substrate 16 and the optical waveguides 12–14, which form an optical waveguide network that includes the Y-junction 20. Other configurations for the optical waveguide network 15 are possible. The particular configuration is shown only for purposes of illustrating and describing the invention.

Figure 2A:
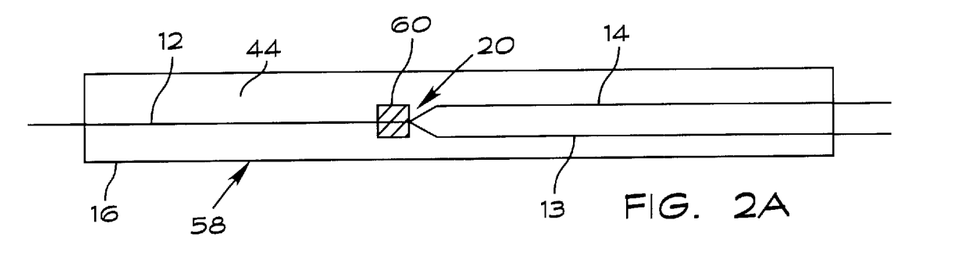
FIGS. 2–15 are top plan views showing patterns of material that can be applied to a substrate to produce a MIOC to eliminate or to reduce surface wave propagation in accordance with the principles of the present invention.
Figure 2B:
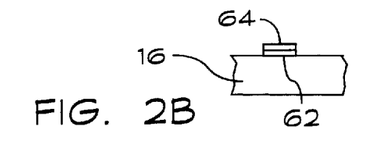
Figure 2C:
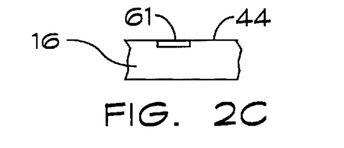

FIG. 2A shows a MIOC 58 having a surface wave blocking structure 60 added to the upper surface 44 of the substrate 16. The structure 60 is added in the region of the optical waveguide 12 adjacent the Y-junction 20. As shown in the top plan view, the structure 60 has a pair of rectangular configurations, one on either side of the waveguide 12, or it can connect to the waveguide 12. As shown in FIG. 2B, the structure 60 may include a first layer 62 of a metal such as titanium followed by a layer 64 of a metal such as of gold. A surface wave incident upon the titanium-gold structure 60 will be either reflected, scattered or absorbed. It should be noted that metallic layers are deposited in accordance with well-known techniques.

The structure 60 may alternatively be a region of the substrate 16 that has a refractive index different from that of lithium niobate. A region of the substrate 16 having a different refractive index is created by proton exchange while the optical waveguides 12–14 are being formed. Part of a surface wave that encounters a change in the refractive index will be reflected, or change direction. The fraction reflected depends upon the difference in the refractive indices and the angle of incidence on the structure surface in accordance with well-known optical principles.

Figure 3:
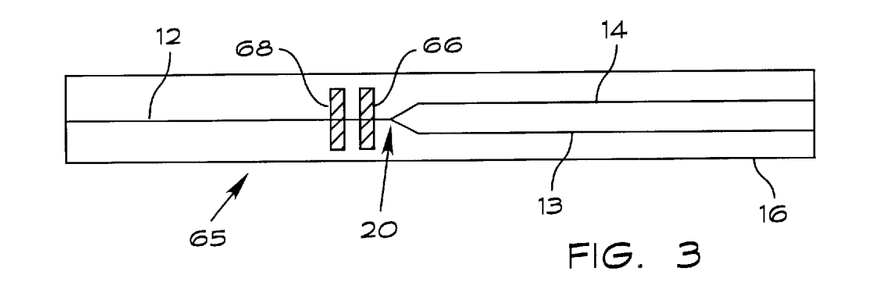

FIG. 3 illustrates a MIOC 65 according to the present invention in which a pair of thin rectangular surface wave blocking structures 66 and 68 are added across the substrate 16. The structures 66 and 68 may be single layer or multi-layer similar in form to those shown in FIGS. 2B–2C. The structures 66 and 68 may either reflect redirect or absorb incident surface waves.

Figure 4:
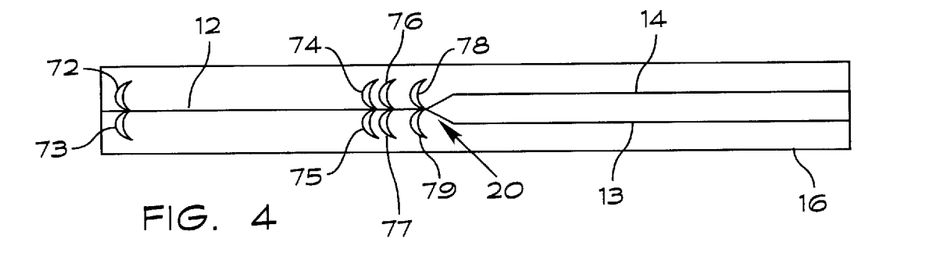

FIG. 4 illustrates a MIOC 70 according to the present invention in which a plurality of focusing regions 72–79 are formed to act as lenses. The focusing regions 72–79 are spaced apart along the length of the optical waveguide 12. The focusing regions 72–79 preferably have very short focal lengths so that surface waves are directed away from the pigtails 32–34 of the MIOC 70. The focusing regions 72–79 may be formed by proton exchange. The focusing regions 72–79 could be located anywhere along the waveguide network 15. The optimum location of these structures will depend upon other structures, i.e. electrodes, as well as the network 15 geometry.

Figure 5:
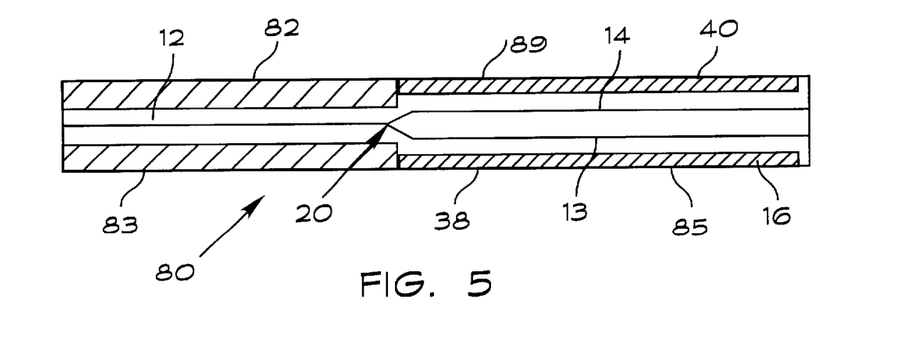

FIG. 5 illustrates an MIOC 80 according to the present invention having a plurality of rectangular structures 82–85 formed thereon. The rectangular structures 82 and 83 are on opposite sides of the optical waveguide 12 adjacent to the side edges 38 and 40 if the substrate 16. The rectangular structures 84 and 85 are adjacent the side edges 38 and 40 of the substrate 16 with the optical waveguides 13 and 14 between them. These would preferably be formed by creating an index change in the material rather than by adding a metal.

Figure 6:
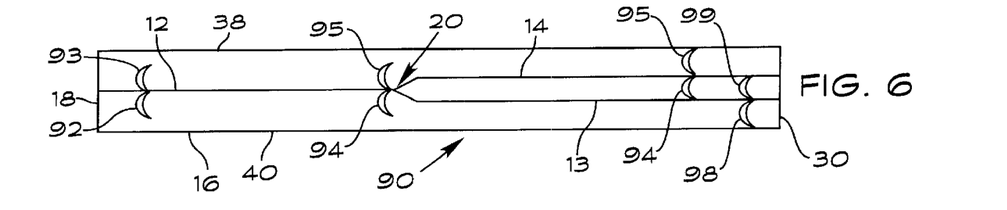

FIG. 6 illustrates a MIOC 90 according to the present invention having a plurality of focusing regions 92–99 which are formed in the substrate 16. The focusing regions 92 and 93 are located near the end 18 of the substrate 16 on opposite sides of the optical waveguide 12. The focusing regions 94 and 95 are on opposite sides of the optical waveguide 12 near the Y-junction 20. The focusing regions 96 and 97 are on opposite sides of the optical waveguide 14 near the end 30 of the substrate 16, and the focusing regions 98, 99 are also near the end 30 but on opposite sides of the optical waveguide 13. The pairs of focusing regions 96, 97 and 98, 99 are offset from one another. The offset should be more than a depolarization length apart to prevent the occurrence of polarization cross coupling. Depolarization length is defined as the coherence length of the light wave divided by the refractive index difference between the TE and TM modes.

Figure 7:
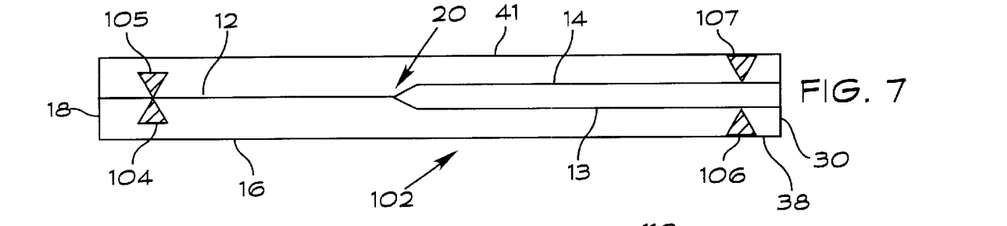

FIG. 7 illustrates a MIOC 102 according to the present invention in which a plurality of triangular structures 104–107 are formed on the substrate 16. The triangular structures 104 and 105 are on opposite sides of the optical waveguide 12 near the end 18 of the substrate 16. The triangles 106 and 107 are near the end 30 of the substrate 16 adjacent the sides 38 and 40, respectively.

Figure 8:
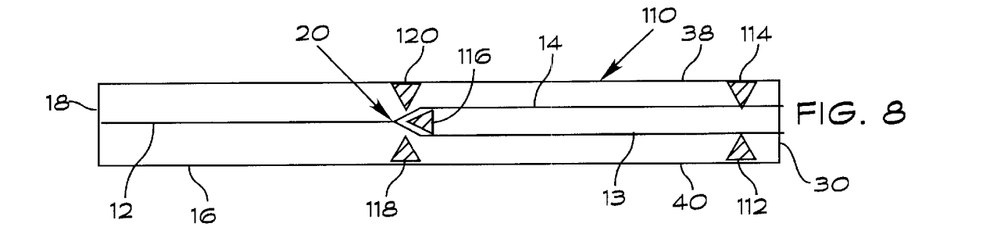

FIG. 8 illustrates a MIOC 110 according to the present invention in which a pair of triangular structures 112 and 114 are formed near the end 30 of the substrate 16 adjacent the sides 38 and 40, respectively. A triangular structure 116 is formed between the optical waveguides 13 and 14 near the Y-junction 20. Triangular structures 118 and 120 are formed on the substrate 16 adjacent the edges 38 and 40, respectively, on opposite sides of the Y-junction 20.

Figure 9:
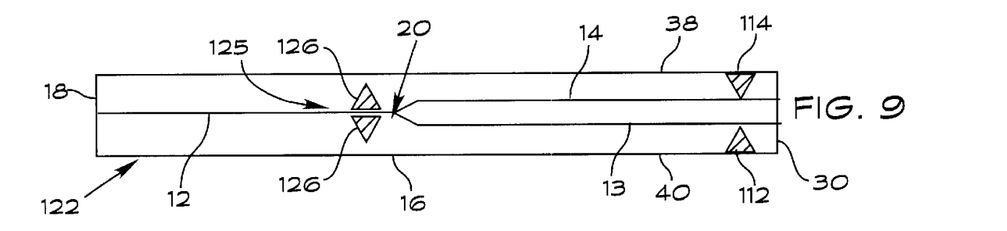

FIG. 9 illustrates a MIOC 102 according to the present invention having the triangular structures 112 and 114 as described above. A pair of triangular structures 124 and 126 are located on the substrate 16 near the Y-junction 20 on opposite sides of the optical waveguide 12. There may be a narrow gap 125 of about 1 to 10 μm between the structures 124 and 126.

Figure 10:
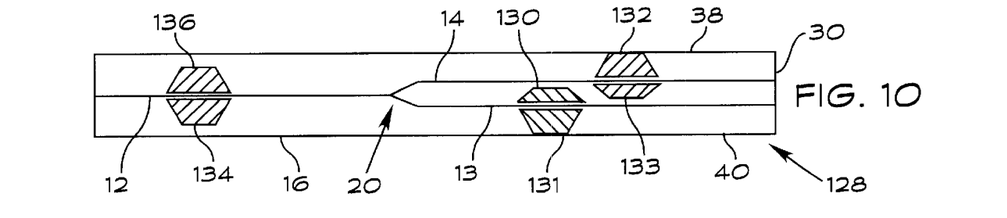

FIG. 10 illustrates a MIOC 128 according to the present invention having a 2 pair of four sided structures 130 –133 located near the optical waveguides 13 and 14. Each pair has a small gap between them The gap is preferably between 1 and 10 microns away from the edge of an adjacent the waveguide structure 12–14. The structures are offset from one another in the same manner as described above with reference to FIG. 6. A first four sided structure 134 is located on one side of the optical waveguide 12, and a second four sided structure 136 is located on the other side. There is a narrow gap of about 1 to 10 82 m between the each of the structures 134, 136 and the waveguide 12.

Figure 11:
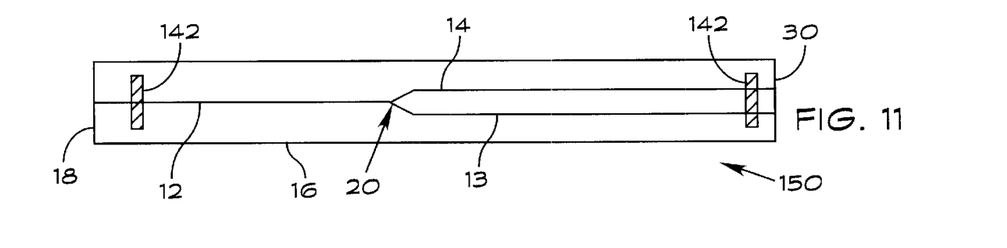

FIG. 11 illustrates a MIOC 140 according to the present invention having a pair of thin rectangular structures 142 and 144 formed near the substrate ends 18 and 30, respectively.

Figure 12:
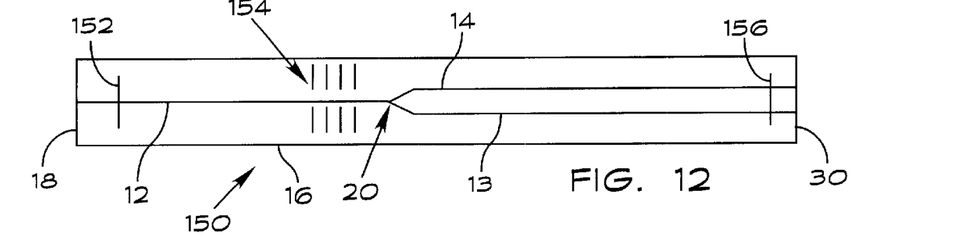

FIG. 12 illustrates a MIOC 150 according to the present invention in which thin lines 152 and 156 of a surface wave diverting, reflecting or absorbing material are located near the substrate ends 18 and 30, respectively. A plurality of closely spaced lines 154 of such material is located adjacent the optical waveguide 12 near the Y-junction 20.

Figure 13:
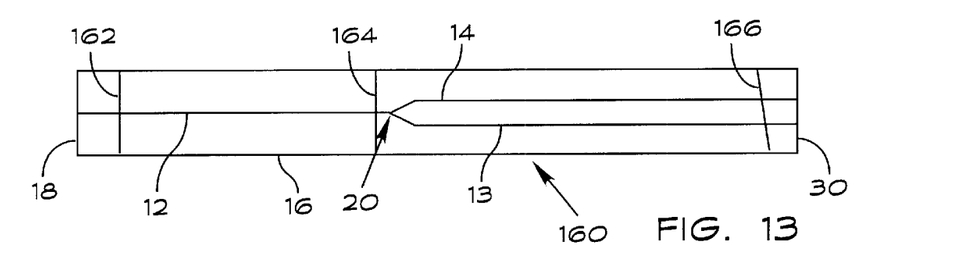

FIG. 13 illustrates a MIOC 160 according to the present invention having a pair of lines 162 and 164 of a surface wave blocking material are located near the opposite ends of the optical waveguide 12. The lines 162 and 164 are perpendicular to the optical waveguide 12. A thin line 166 of a surface wave blocking material extends across the optical waveguides 13 and 14. The line 166 is not perpendicular to the axes of the optical waveguides 13 and 14.

Figure 14:
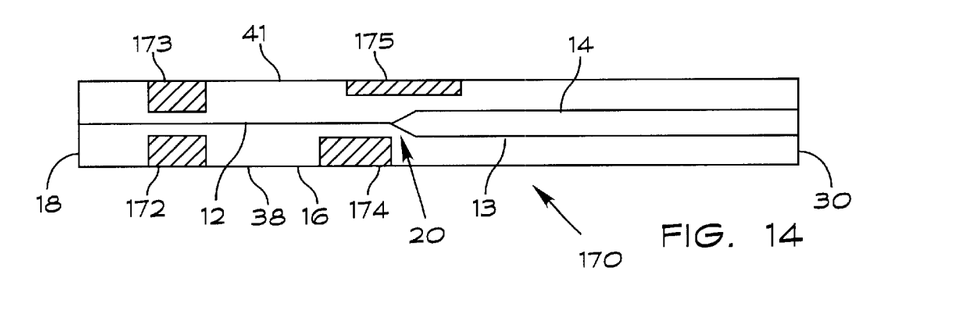

FIG. 14 illustrates a MIOC 170 according to the present invention in which a plurality of rectangular structures 172 –175 of a surface wave blocking material are formed on the substrate 16. The rectangles 172 and 173 are on opposite sides of the optical waveguide 12 and are adjacent the sides 38 and 40, respectively, of the substrate 16. The rectangle 174 is adjacent the side 38 near the optical waveguide 12 and the Y-junction 20. The rectangle 175 is adjacent the side 40 near optical waveguides 12 and 14 and the y-junction 20.

Figure 15:
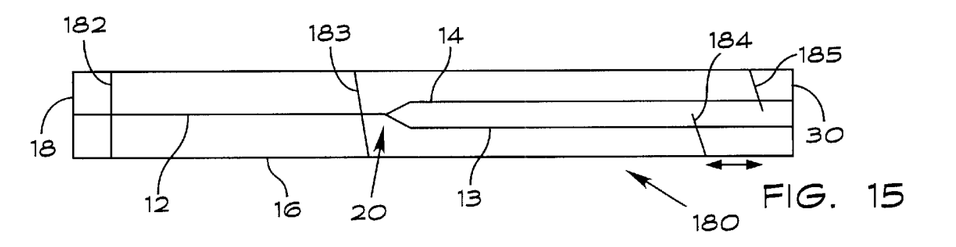

FIG. 15 illustrates a MIOC 180 having a plurality of thin lines 182–185 of a surface wave blocking material. The line 182 is perpendicular to the optical waveguide 12 and is near the end 18 of the substrate 16. The line 182 extends at an angle across the substrate 16 near the Y-junction 20 at an angle of about 80°. The lines 184 and 185 extend at angles of about 80° across the optical waveguides 13 and 14, respectively. The lines 184, 185 are offset from one another in the same manner as described above with reference to FIG. 6.

Figure 16:
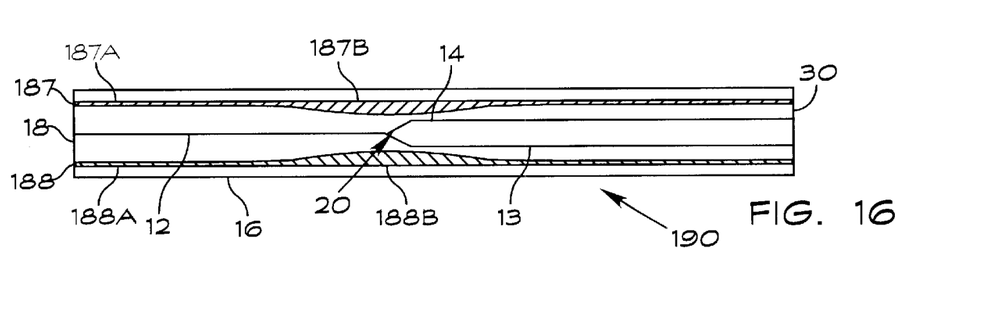

FIG. 16 illustrates a MIOC 190 with added structures 187 and 188 along the outsides of the waveguide network 15. The structures 187 and 188 are lines 187A and 188A, respectively running the length of the MIOC 190. The structures 187 and 188 each have wider curved portions 187B and 188B, respectively. The curved portions 187B and 188B are near in the central region of the upper surface of the MIOC 190 the Y-junction 20 and are arranged to trap, divert, or absorb light which would normally reflect off the edge to be coupled into a pigtail.

The structures and methods disclosed herein illustrate the principles of the present invention. The invention may be embodied in other specific forms without departing from its spirit or essential characteristics. Although several embodiments of the invention have been described, it should be recognized that many other arrangements of the surface wave blocking or reflecting devices may be formed within the scope of the present invention. Therefore, the described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An integrated optics chip, comprising:
   a substrate formed of an electrooptically active material;
   an optical waveguide network formed on a first surface of the substrate, the optical waveguide network including an input facet where optical signals may be input to the optical waveguide network and an output facet where optical signals may be output from the optical waveguide network, the waveguide network further including a plurality of optical waveguides arranged to form a Y-junction; and
   a structure located in an upper layer of the substrate over a first one of the plurality of optical waveguides adjacent the Y-junction and arranged to prevent surface waves that propagate in the substrate from coupling into the output facet, the structure comprising a first layer that includes titanium and a second layer that comprises gold.

2. The integrated optics chip of claim 1, wherein the substrate has a first refractive index and the structure comprises a region of the substrate that has been processed to have a second refractive index that differs from the first refractive index.

3. The integrated optics chip of claim 1, wherein the substrate has a first refractive index, further comprising a plurality of generally rectangular shaped regions of the substrate that have been processed to have a second refractive index that differs from the first refractive index.

4. The integrated optics chip of claim 3, wherein the plurality of generally rectangular shaped regions are arranged to be adjacent to the optical waveguide network with a gap of about 1 to 23 μm between the rectangular shaped regions and the waveguides.

5. The integrated optics chip of claim 1 wherein the substrate has a first refractive index, further comprising a plurality of generally triangular shaped regions of the substrate that have been processed to have a second refractive index that differs from the first refractive index.

6. The integrated optics chip of claim 5 wherein the plurality of generally triangular shaped regions are arranged to be adjacent the optical waveguides with a gap of about 1 to 10 μm therebetween.

7. The integrated optics chip of claim 5 wherein the optical waveguide network includes a plurality of optical waveguides arranged to form a Y-junction with a first one of the triangular shaped regions being between a pair of optical waveguides at the Y-junction and the Y-junction being located between a pair of the generally triangular shaped regions.

8. The integrated optics chip of claim 1 wherein the substrate has a first refractive index and the structure comprises a pair of region of the substrate that have been processed to have a second refractive index that differs from the first refractive index located near opposite ends of the optical waveguide network.

9. The integrated optics chip of claim 1 wherein the substrate has a first refractive index and wherein the structure comprises a plurality of thin line regions of the substrate having refractive indices that differ from the first refractive index.

10. The integrated optics chip of claim 9 wherein the thin line regions cross the optical waveguide network at an angle of 0 to 30 degrees from perpendicular.

11. The integrated optics chip of claim 1, further comprising a metal layer formed on the region of the substrate that includes a second refractive index that differs from the first refractive index.

12. The integrated optics chip of claim 1 wherein the structure comprises a metal layer formed on the substrate.

13. An integrated optics chip, comprising:
a substrate formed of an electrooptically active material, the substrate having a first refractive index;
an optical waveguide network formed on a first surface of the substrate, the optical waveguide network having an input facet where optical signals may be input to the optical waveguide network and an output facet where optical signals may be output from the optical waveguide network; and
a structure located in an upper layer of the substrate arranged to prevent surface waves that propagate in the substrate from coupling into the output facet, the structure comprising a region of the substrate that has a second refractive index that differs from the first refractive index, the structure being formed as a focusing region having a focal length that directs surface waves away from the facets of the optical waveguide network.

14. The integrated optics chip of claim 13, further comprising a plurality or focusing regions in the substrate arranged to direct surface waves away from the facets of the optical waveguide network.

15. An integrated optics chip, comprising:
a substrate formed of an electrooptically active material, the substrate having a first refractive index;
an optical waveguide network formed on a first surface of the substrate, the optical waveguide network having an input facet where optical signals may be input to the optical waveguide network and an output facet where optical signals may be output from the optical waveguide network; and
a structure located in an upper layer of the substrate arranged to prevent surface waves that propagate in the substrate from coupling into the output facet, the structure comprising a plurality of thin line regions of the substrate having refractive indices that differ from the first refractive index, wherein the thin line regions cross the optical waveguide network at an angle of 0 to 30 degrees from perpendicular to the optical waveguide network and wherein the thin line regions are approximately 1 to 30 μm wide and extend the full width of the substrate.

16. An integrated optics chip, comprising:
a substrate formed of an electrooptically active material, the substrate having a first refractive index;
an optical waveguide network formed on a first surface of the substrate, the optical waveguide network including an input facet where optical signals may be input to the optical waveguide network and an output facet where optical signals may be output from the optical waveguide network, the waveguide network further including a plurality of optical waveguides arranged to form a Y-junction and the structure is located over a first one of the plurality of optical waveguides adjacent the Y-junction;
a structure located in an upper layer of the substrate arranged to prevent surface waves that propagate in the substrate from coupling into the output facet; and
a region of the substrate having a second refractive index that differs from the first refractive index formed to have a thin linear portion that extends substantially the length of the substrate and a curved wider portion that extends from a location adjacent a side of the substrate toward the Y-junction.

17. A method for forming an integrated optics chip, comprising the steps of:
providing a substrate formed of an electrooptically active material;
forming an optical waveguide network on a first surface of the substrate, the optical waveguide network having an input facet where optical signals may be input to the optical waveguide network and an output facet where optical signals may be output from the optical waveguide network;
forming the optical waveguide network to include a plurality of optical waveguides arranged to form a Y-junction;
forming a structure in an upper layer of the substrate arranged to prevent surface waves that propagate in the substrate from coupling into the output facet by a process that includes the steps of forming the structure to comprise a first layer that comprises titanium and a second layer that comprises gold; and
locating the structure over a first one of the plurality of optical waveguides adjacent the Y-junction.

18. The method of claim 17 wherein the substrate has a first refractive index including the step of processing a region of the substrate to have a second refractive index that differs from the first refractive index.

19. The method of claim 17 wherein the substrate has a first refractive index,, further comprising the step of forming a plurality of generally rectangular shaped regions of the substrate to have a second refractive index that differs from the first refractive index.

20. The integrated optics chip of claim 19 wherein the plurality of generally rectangular shaped regions are arranged to be adjacent to the optical waveguides with a gap of about 1 to 23 μm between t rectangular shaped regions and the waveguides.

21. The method of claim 17 wherein the substrate has a first refractive index, further comprising the step of forming a plurality of generally triangular shaped regions of the substrate to have a second refractive index that differs from the first refractive index.

22. The integrated optics chip of claim 21 wherein the plurality of generally triangular shaped regions are arranged to be adjacent to the optical waveguide with a gap of about 1 to 23 μm between the triangular shaped regions and the waveguides.

23. The method of claim 21 including the step of arranging the plurality of generally triangular shaped regions to be adjacent the optical waveguides with a gap of about 1 to 10 μm therebetween.

24. The method of claim 21 including the steps of forming the optical waveguide network to includes a plurality of optical waveguides arranged to form a Y-junction, forming a first one of the triangular shaped regions being between a pair of optical waveguides at the Y-junction and placing the Y-junction between a pair of the generally triangular shaped regions.

25. The method of claim 17 wherein the substrate has a first refractive index, further including the step of forming the structure to comprise a pair of regions of the substrate that have been processed to have a second refractive index that differs from the first refractive index located near opposite ends of the optical waveguide network.

26. The method of claim 17 wherein the substrate has a first refractive index, farther including the step of forming the structure to comprise a plurality of thin line regions of the substrate having refractive indices that differ from the first refractive index.

27. The integrated optics chip of claim 26 wherein the thin line regions cross the waveguide network at an angle of 0 to 30 degrees from perpendicular.

28. The method of claim 17 herein the structure comprises a metal layer formed on the substrate.

29. A method for forming an integrated optics chip, comprising the steps of:
 providing a substrate formed of an electrooptically active material having a first refractive index;
 forming a region of the substrate to have a second refractive index that differs from the first refractive index;
 forming an optical waveguide network on a first surface of the substrate, the optical waveguide network having an input facet where optical signals may be input to the optical waveguide network and an output facet where optical signals may be output from the optical waveguide network; and
 forming a structure in an upper layer of the substrate arranged to prevent surface waves that propagate in the substrate from coupling into the output facet by a process that includes the step of forming the structure as a focusing region having a focal length that directs surface waves away from the facets of the optical waveguide network.

30. The method of claim 29, further comprising the step of forming a plurality of focusing regions in the substrate arranged to direct surface waves away from the facets of the optical waveguide network.

31. A method for forming an integrated optics chip, comprising the steps of:
 providing a substrate formed of an electrooptically active material having a first refractive index;
 forming an optical waveguide network on a first surface of the substrate, the optical waveguide network having an input facet where optical signals may be input to the optical waveguide network and an output facet where optical signals may be output from the optical waveguide network; and
 forming a structure in an upper layer of the substrate arranged to prevent surface waves that propagate in the substrate from coupling into the output facet by a process that includes forming the structure to comprise a plurality of thin line regions of the substrate having refractive indices that differ from the first refractive index;
 arranging the thin line regions cross the waveguide network at an angle of 0 to 30 degrees from perpendicular; and
 forming the thin line regions to be approximately 1 to 30 μm wide and to extend the full width of the substrate.

32. A method for forming an integrated optics chip, comprising the steps of:
 providing a substrate formed of an electrooptically active material having a first refractive index;
 forming an optical waveguide network on a first surface of the substrate, the optical waveguide network having an input facet where optical signals may be input to the optical waveguide network and an output facet where optical signals may be output from the optical waveguide network; and
 forming a structure in an upper layer of the substrate arranged to prevent surface waves that propagate in the substrate from coupling into the output facet;
 processing a region of the substrate to have a second refractive index that differs from the first refractive index and forming the region to have a thin linear portion that extends substantially the length of the substrate and a curved wider portion that extends from a location adjacent a side of the substrate toward the Y-junction.

* * * * *